United States Patent Office 3,375,217
Patented Mar. 26, 1968

3,375,217
PLASTICIZED VINYL CHLORIDE POLYMERS
Wayne E. Smith, Shawnee, Kans., and Harry D. Anspon, Kansas City, Mo., assignors to Gulf Research & Development Company, Pittsburgh, Pa., a corporation of Delaware
No Drawing. Filed Feb. 2, 1966, Ser. No. 524,488
4 Claims. (Cl. 260—30.4)

This invention relates to new and useful compositions and more particularly to vinyl chloride polymers plasticized with certain lactonized methyl propanol/methacrylic acid polymers.

Synthetic polymers of vinyl chlorides, including homopolymers and copolymers thereof, are known and have wide industrial uses such as coating paper and textiles, for preparing film and sheet material, and in fabrication of shaped objects by molding and the like. Although the vinyl chloride resins are valuable in these applications because of their chemical inertness, it has been found necessary to employ plasticizers to modify the resins in order to adapt them for their intended application.

One object of this invention is to provide a novel class of plasticizers suitable for incorporation in vinyl chloride polymers.

Another object of this invention is to provide improved vinyl chloride polymer compositions having polylactones incorporated therein.

A further object of this invention is to provide improved vinyl chloride polymer compositions plasticized with a novel class of polylactone resins.

Other objects and advantages of this invention will become more apparent from the following description thereof.

It has been discovered in accordance with this invention that vinyl chloride polymers can be readily plasticized with hydroxyl-carboxyl-lactone containing polymers such as the polymers of lactonized poly(methyl propanol/methacrylic acid) disclosed in copending application U.S. Ser. No. 466,793 filed June 24, 1965, by W. E. Smith et al. As described in the aforesaid application, these specific lactonized polymers are derivatives of methacrolein polymers having substantially all of the aldehyde groups of the methacrolein component reduced and oxidized to substantially equal numbers of hydroxyl and carboxyl groups, of which a portion are lactonized to provide the desired product which can be designated as polymers of partially lactonized poly(methyl propanol/methacrylic acid). The partially lactonized poly(methyl propanol/methacrylic acid) resin products of this copending application found particularly useful as plasticizers, in accordance with this invention, are those which have a molecular weight in the range of about 200 to 2,000, and which contain between about 50 to about 90 mole percent of monomeric lactone groups having the following structure, including mirror images thereof,

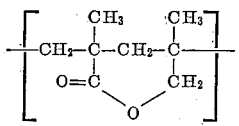

and between about 5 to about 25 mole percent, each, of repeating methyl propanol and methacrylic acid units having, respectively, the following structures

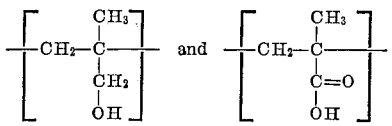

The partially lactonized poly(methyl propanol/methacrylic acid) polymers comprehended as plasticizers in this invention can be obtained by a two-stage process as disclosed in the aforesaid copending application wherein the first stage involves the preparation of Cannizzaro-type intermediate products by reacting polymethacrolein with a strong base, such as alkali metal hydroxides, at a pH of 8 or above, in a suitable liquid medium which is preferably a solvent for the final and desired products obtained in the subsequent and second stage of the process. A typical and preferred reaction medium for the Cannizzaro-type reaction is water. The reaction is carried out at a temperature of at least about 75° C.; and where a reaction medium, such as water, is used having a boiling point below 125° C., this first-stage reaction will normally be effected under a pressure sufficient to prevent boiling-off of the medium. It was found that this first-stage reaction must be carried out at a temperature of at least about 75° C. in order to completely convert the aldehyde and acetal groups of the base polymethacrolein to a corresponding equal number of hydroxyl and carboxylate groups, and that where lower temperatures are employed the resultant first-stage products will contain substantial quantities of residual aldehyde and acetal groups.

The poly(methyl propanol/methacrylic acid salt) products, of the first-stage Cannizzaro-type reaction, are substantially free of aldehyde and acetal groups and will contain repeating units having the structures

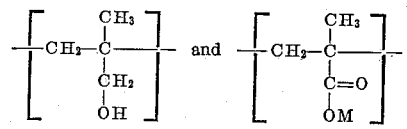

wherein M is a cation corresponding to the cation used, and will normally be a monovalent cation such as $NH_4^+$, $Na^+$, $K^+$, $Li^+$, and the like.

The second stage of the process is an acidification step which involves reacting the first-stage reaction products with a nonoxidizing mineral acid at a temperature of at least about 30° C., which normally will be about 30° C., to lactonize adjacent hydroxyl and carboxylic acid groups. The resultant product is a terpolymer comprising a partially lactonized polymer of poly(methyl propanol/methacrylic acid) consisting essentially of from about 20 to about 90 mole percent, based on the terpolymer, of repeating lactone groups having the structure

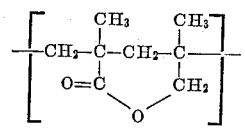

and from about 5 to about 40 mole percent each of repeating units of methyl propanol and methacrylic acids having the following respective structures

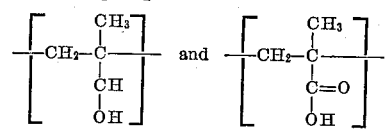

The vinyl chloride polymers comprehended in this invention include homopolymers of vinyl chloride and copolymers thereof containing in the polymer molecules between about 50 to about 100 weight percent of chemically combined vinyl chloride. Suitable comonomers capable of copolymerizing with vinyl chloride are a well-known class of compounds and include, for example, vinyl esters such as vinyl acetate, acrylates such as acrylic acide esters and methacrylic acid esters, vinyl alkyl sulfonates, styrene, acrylonitrile, maleic acid and fumaric acid compounds, vinyl ethers such as vinyl ethyl ether, and the like.

The proportions of the partially lactonized poly- (methyl propanol/methacrylic acid) resin to the vinyl chloride polymers can be varied within wide limits depending on the monomers used and the desired properties of the final product. In general, about 10 to about 50 parts, and preferably about 20 to about 40 parts, by weight, of the lactonized poly(methyl propanol/methacrylic acid) resin will be used per 100 parts of the vinyl chloride polymer. The blending of the components can be effected by procedures well known in the art. For example, the partially lactonized poly(methyl propanol/methacrylic acid) resin can be mixed with the vinyl chloride polymer in the desired proportions, and then thoroughly blended together by using a Banbury mixer or by forcing a melt of the mix through a compounding extruder type of mixer, with the solidified extrudate suitably comminuted or subdivided into pellet or granule form of any desired size. As will be appreciated, the mix can be blended or compounded together by means of other conventional techniques such as by milling on hot rolls or by working in a plasticator. The final blended vinyl chloride polymer-stabilizer products may then be used for the production of various fabricated structures and shapes such as, for example, film, sheet, filaments, bars, rods, tubes, etc., in accordance with general techniques and using apparatus normally employed with conventional vinyl chloride polymers. Also, it is to be understood that in addition to the foregoing primary components, the compositions may include minor amounts of conventional additives normally employed in the art, as for example additional plasticizers, pigments, fillers, stabilizers and the like.

The following examples are set forth to illustrate the invention, with all parts and percentages, unless otherwise indicated, specified as parts and percentages by weight.

Example I

A partially lactonized poly(methyl propanol/methacrylic acid) was prepared as follows:

Thirty-three parts of methacrolein was polymerized at 20 to 25° C. in 200 parts of water containing 25 parts ethanol and 10 parts 4% NaOH solution. After one hour the reaction was terminated, and the product extracted with ethyl ether, dried over $MgSO_4$ and stripped at 100° C. and 12 mm. Hg pressure. The product polymethacrolein was a white, viscous liquid having a molecular weight of about 210.

The polymethacrolein product was converted to a water-soluble Cannizzaro-type product by reaction with sodium hydroxide at 100° C. for one hour, according to the following charge ratios:

| | Parts |
|---|---|
| Polymethacrolein product | 70 |
| NaOH | 22 |
| Water | 300 |

The water-soluble Cannizzaro-type product was then acidified to a pH of 4.0 with hydrochloric acid. This final product was a polymer of partially lactonized poly(methyl propanol/methacrylic acid), which separated as a second phase upon acidification, and was isolated by extraction with ethyl ether and stripping at 100° C. and 12 mm. Hg pressure. The resultant product was a viscous liquid whose infra-red spectrum confirmed the presence of six-membered lactone rings.

The partially lactonized poly(methyl propanol/methacrylic acid) resin had a melting point of −55° C., a boiling point of 261° C., and a neutralization equivalent with tetramethyl ammonium hydroxide of 2240 mg./meq.

Example II

A plasticized resin was prepared by mixing together 30 parts of a commercial polyvinyl chloride powder, 20 parts of the partially lactonized poly(methyl propanol/methacrylic acid) resin of Example I and 1 part of a commercial stabilizer "Thermolite 31," and the mixture blended in a "Brabender Plasticorder" for five minutes at 140° C. The resultant composition was molded in a platen press at 120° C. to provide a transparent and flexible sheet. The clearness of the sheet illustrated the good compatibility of the components.

Example III

A plasticized composition was prepared by milling together 50 parts of the partially lactonized poly(methyl propanol/methacrylic acid) resin of Example I with 50 parts of a commercial polyvinyl chloride for 10 minutes at 150° C. The resultant composition gave clear, transparent and flexible films when molded at temperatures of about 150° C. These films were characterized by a Shore A hardness of 92, a 100 percent modulus of 2490 p.s.i., a tensile strength of 3190 p.s.i., and an elongation of 210 percent.

The plasticized compositions of this invention may be used in any of the ways that the usual plasticized vinyl chloride polymers are used. Pigments, fillers, stabilizers, dyes, and other materials may be added to obtain varied effects. The compositions may be extruded, calendered, molded, or used in the form of a solution in a suitable solvent.

Although the invention has been described with reference to specific materials, embodiments and details, various modifications and changes, within the scope of the invention, will be apparent to one skilled in the art and are contemplated to be embraced within the invention.

What is claimed is:

1. A composition comprising (A) a vinyl chloride polymer and (B) a plasticizer compounded therewith, said plasticizer comprising a polymer of partially lactonized poly(methyl propanol/methacrylic acid) having a molecular weight from about 200 to about 2000, being substantially free of aldehyde and acetal groups, and containing monomeric units of the structures:

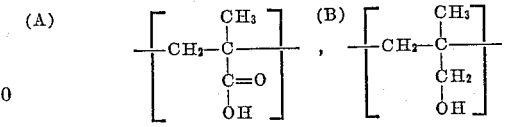

and

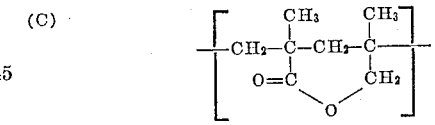

where said partially lactonized polymer contains from about 20 to about 90 mole percent of monomeric structure (C) and about 15 to about 40 mole percent of monomeric structures (A) and (B).

2. The composition of claim 1 wherein said lactonized poly(methyl propanol-methacrylic acid is derived from a methacrolein polymer having substantially all of the aldehyde groups of the methacrolein reduced and oxidized to substantially equal numbers of hydroxyl and carboxyl groups.

3. The composition of claim 1 wherein the composition comprises, by weight, about 10 to 50 parts of said lactonized poly(methyl propanol/methacrylic acid) per 100 parts of said vinyl chloride polymer.

4. The composition of claim 3 wherein said lactonized poly(methyl propanol/methacrylic acid) is derived from a methacrolein polymer having substantially all of the aldehyde groups of the methacrolein reduced and oxidized to substantially equal numbers of hydroxyl and carboxyl groups.

References Cited

FOREIGN PATENTS 803,053    5/1955    Canada.

MORRIS LIEBMAN, *Primary Examiner.*

R. S. BARON, *Assistant Examiner.*